United States Patent
Gajula et al.

(10) Patent No.: US 11,743,847 B2
(45) Date of Patent: Aug. 29, 2023

(54) SYNCHRONIZATION SIGNAL BLOCK PRIORITIZATION FOR PHYSICAL BROADCAST CHANNEL BASED BEAM MEASUREMENTS

(71) Applicant: QUALCOMM Incorporated, San Diego, CA (US)

(72) Inventors: Nagaraju Gajula, San Diego, CA (US); Uzma Khan Qazi, San Diego, CA (US); Yong Li, San Diego, CA (US); Andrew Walter Janiszewski, Longmont, CO (US); Kang Gao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 17/364,394

(22) Filed: Jun. 30, 2021

(65) Prior Publication Data

US 2023/0007602 A1  Jan. 5, 2023

(51) Int. Cl.
*H04W 56/00* (2009.01)
*H04W 24/08* (2009.01)
*H04W 24/10* (2009.01)
*H04W 16/28* (2009.01)

(52) U.S. Cl.
CPC ......... *H04W 56/001* (2013.01); *H04W 16/28* (2013.01); *H04W 24/08* (2013.01); *H04W 24/10* (2013.01)

(58) Field of Classification Search
CPC ... H04W 56/001; H04W 16/28; H04W 24/08; H04W 24/10
See application file for complete search history.

(56) References Cited

U.S. PATENT DOCUMENTS

| | | | |
|---|---|---|---|
| 11,012,958 B2 * | 5/2021 | Liu | H04W 56/00 |
| 2019/0230544 A1 * | 7/2019 | Zhu | H04W 56/00 |
| 2019/0280784 A1 * | 9/2019 | Kwak | H04W 72/046 |
| 2019/0394634 A1 * | 12/2019 | Akkarakaran | H04B 7/0617 |
| 2020/0204237 A1 * | 6/2020 | Zhou | H04B 7/0619 |
| 2020/0359245 A1 * | 11/2020 | Da Silva | H04B 7/0695 |
| 2021/0175966 A1 * | 6/2021 | Rohde | H04B 7/2041 |
| 2022/0131591 A1 * | 4/2022 | Huang | H04W 16/28 |
| 2022/0210844 A1 * | 6/2022 | MolavianJazi | H04L 5/005 |

FOREIGN PATENT DOCUMENTS

| | | | |
|---|---|---|---|
| WO | WO-2022044287 A1 * | 3/2022 | |
| WO | WO-2022195567 A1 * | 9/2022 | |

\* cited by examiner

*Primary Examiner* — Deepa Belur
(74) *Attorney, Agent, or Firm* — Danai Nelisile Mhembere; Holland & Hart LLP

(57) ABSTRACT

Methods, systems, and devices for wireless communications are described. The method includes receiving control signaling indicating for the UE to monitor a set of multiple synchronization signal blocks during a first transmission time interval, determining a priority order of the set of multiple synchronization signal blocks based on a number of beam switch events that occur during the first transmission time interval exceeding a beam switch capability limit of the UE, performing a set of multiple beam measurements of at least a subset of the set of multiple synchronization signal blocks that occur during the first transmission time interval according to the priority order of the set of multiple synchronization signal blocks, and transmitting a beam report to a base station based on the set of multiple beam measurements.

30 Claims, 11 Drawing Sheets

SYNCHRONIZATION SIGNAL BLOCK PRIORITIZATION FOR PHYSICAL BROADCAST CHANNEL BASED BEAM MEASUREMENTS

FIELD OF TECHNOLOGY

The following relates to wireless communications, including synchronization signal block prioritization for physical broadcast channel based beam measurements.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems may support synchronization signal blocks for physical broadcast channel-based beam measurements. In some cases, wireless systems may experience conflicts in relation to beam measurements for various reasons, which may result in poor system performance and poor user experience.

SUMMARY

The described techniques relate to improved methods, systems, devices, and apparatuses that support synchronization signal block prioritization for physical broadcast channel based beam measurements. Generally, the described techniques provide for a user equipment (UE) receiving control signaling indicating for the UE to monitor synchronization signal blocks during a first transmission time interval. In some cases, the UE may determine a priority order of the synchronization signal blocks based on a beam switch capability limit of the UE (e.g., based on a number of beam switch events that occur during the first transmission time interval that exceed the beam switch capability limit of the UE). In some cases, the UE may perform beam measurements of at least a subset of the synchronization signal blocks of the first transmission time interval according to the priority order of the synchronization signal blocks (e.g., perform beam measurements of relatively high priority synchronization signal blocks and dropping or rescheduling beam measurements of relatively low priority synchronization signal blocks). In some cases, the UE may transmit a beam report to a base station based on the of beam measurements the UE selects to perform.

A method for wireless communication at a user equipment (UE) is described. The method may include receiving control signaling indicating for the UE to monitor a set of multiple synchronization signal blocks during a first transmission time interval, determining a priority order of the set of multiple synchronization signal blocks based on a number of beam switch events that occur during the first transmission time interval exceeding a beam switch capability limit of the UE, performing a set of multiple beam measurements of at least a subset of the set of multiple synchronization signal blocks that occur during the first transmission time interval according to the priority order of the set of multiple synchronization signal blocks, and transmitting a beam report to a base station based on the set of multiple beam measurements.

An apparatus for wireless communication at a UE is described. The apparatus may include a processor, memory coupled with the processor, and instructions stored in the memory. The instructions may be executable by the processor to cause the apparatus to receive control signaling indicating for the UE to monitor a set of multiple synchronization signal blocks during a first transmission time interval, determine a priority order of the set of multiple synchronization signal blocks based on a number of beam switch events that occur during the first transmission time interval exceeding a beam switch capability limit of the UE, perform a set of multiple beam measurements of at least a subset of the set of multiple synchronization signal blocks that occur during the first transmission time interval according to the priority order of the set of multiple synchronization signal blocks, and transmit a beam report to a base station based on the set of multiple beam measurements.

Another apparatus for wireless communication at a UE is described. The apparatus may include means for receiving control signaling indicating for the UE to monitor a set of multiple synchronization signal blocks during a first transmission time interval, means for determining a priority order of the set of multiple synchronization signal blocks based on a number of beam switch events that occur during the first transmission time interval exceeding a beam switch capability limit of the UE, means for performing a set of multiple beam measurements of at least a subset of the set of multiple synchronization signal blocks that occur during the first transmission time interval according to the priority order of the set of multiple synchronization signal blocks, and means for transmitting a beam report to a base station based on the set of multiple beam measurements.

A non-transitory computer-readable medium storing code for wireless communication at a UE is described. The code may include instructions executable by a processor to receive control signaling indicating for the UE to monitor a set of multiple synchronization signal blocks during a first transmission time interval, determine a priority order of the set of multiple synchronization signal blocks based on a number of beam switch events that occur during the first transmission time interval exceeding a beam switch capability limit of the UE, perform a set of multiple beam measurements of at least a subset of the set of multiple synchronization signal blocks that occur during the first transmission time interval according to the priority order of the set of multiple synchronization signal blocks, and transmit a beam report to a base station based on the set of multiple beam measurements.

Some examples of the method, apparatuses, and non-transitory computer-readable medium described herein may further include operations, features, means, or instructions for transmitting the beam report requesting that the base station transmit using a first transmission beam of a set of multiple available transmission beams, where the set of multiple beam measurements may be measurements of the set of multiple available transmission beams.

Some examples of the method, apparatuses, and non-transitory computer-readable medium described herein may further include operations, features, means, or instructions for identifying a priority rule for determining the priority order of the synchronization signal blocks, the priority rule indicating that a synchronization signal block of a serving cell may have a higher priority than a synchronization signal block of a candidate cell associated with cell reselection.

Some examples of the method, apparatuses, and non-transitory computer-readable medium described herein may further include operations, features, means, or instructions for identifying a priority rule for determining the priority order of the synchronization signal blocks, the priority rule indicating that a synchronization signal block of a serving cell and a synchronization signal block of a candidate cell each may have a higher priority than one or more other synchronization signal blocks of the set of multiple synchronization signal blocks.

Some examples of the method, apparatuses, and non-transitory computer-readable medium described herein may further include operations, features, means, or instructions for identifying a priority rule for determining the priority order of the synchronization signal blocks, the priority rule indicating that a first synchronization signal block having a higher signal quality metric may be prioritized over a second synchronization signal block having a lower signal quality metric.

Some examples of the method, apparatuses, and non-transitory computer-readable medium described herein may further include operations, features, means, or instructions for performing a measurement of a first signal quality metric of the first synchronization signal block and a second signal quality metric of the second synchronization signal block that occur during a second transmission time interval that precedes the first transmission time interval.

In some examples of the method, apparatuses, and non-transitory computer-readable medium described herein, the first and second signal quality metrics may be reference signal received power metrics, or reference signal received quality metrics, or received signal strength indicator metrics, or signal to interference plus noise ratio metrics, or signal to noise ratio metrics, or any combination thereof.

Some examples of the method, apparatuses, and non-transitory computer-readable medium described herein may further include operations, features, means, or instructions for rescheduling beam measurement of a physical broadcast channel of the first synchronization signal block from the first transmission time interval to a second transmission time interval that occurs after the first transmission time interval based on the priority order and performing a beam measurement of the physical broadcast channel of the first synchronization signal block based on the rescheduling.

Some examples of the method, apparatuses, and non-transitory computer-readable medium described herein may further include operations, features, means, or instructions for identifying a priority rule for determining the priority order of the synchronization signal blocks, the beam switch events that occur during the first transmission time interval, a subcarrier spacing of the first transmission time interval, or any combination thereof.

In some examples of the method, apparatuses, and non-transitory computer-readable medium described herein, each of the synchronization signal blocks includes a primary synchronization signal, a first physical broadcast channel, a secondary synchronization signal, and a second physical broadcast channel.

Some examples of the method, apparatuses, and non-transitory computer-readable medium described herein may further include operations, features, means, or instructions for dropping a beam measurement of the second physical broadcast channel of at least one of the synchronization signal blocks based on the priority order.

Some examples of the method, apparatuses, and non-transitory computer-readable medium described herein may further include operations, features, means, or instructions for dropping a beam measurement of the second physical broadcast channel of a first synchronization signal block of the synchronization signal blocks before dropping a beam measurement of the second physical broadcast channel of a second synchronization signal block of the synchronization signal blocks based on the priority order indicating that a priority of the first synchronization signal block may be less than a priority of the second synchronization signal block.

Some examples of the method, apparatuses, and non-transitory computer-readable medium described herein may further include operations, features, means, or instructions for dropping performing a beam measurement of a physical broadcast channel of a first synchronization signal block of the set of multiple synchronization signal blocks based on the priority order of the synchronization signal blocks.

In some examples of the method, apparatuses, and non-transitory computer-readable medium described herein, the beam switch capability limit may be based on a clock mode of the UE.

In some examples of the method, apparatuses, and non-transitory computer-readable medium described herein, the number of beam switch events that occur during the first transmission time interval may be based on a number of synchronization signal blocks that occur during the first transmission time interval.

In some examples of the method, apparatuses, and non-transitory computer-readable medium described herein, the number of beam switch events correspond to a number of beams monitored by the UE during the first transmission time interval.

DETAILED DESCRIPTION

Figure 1:
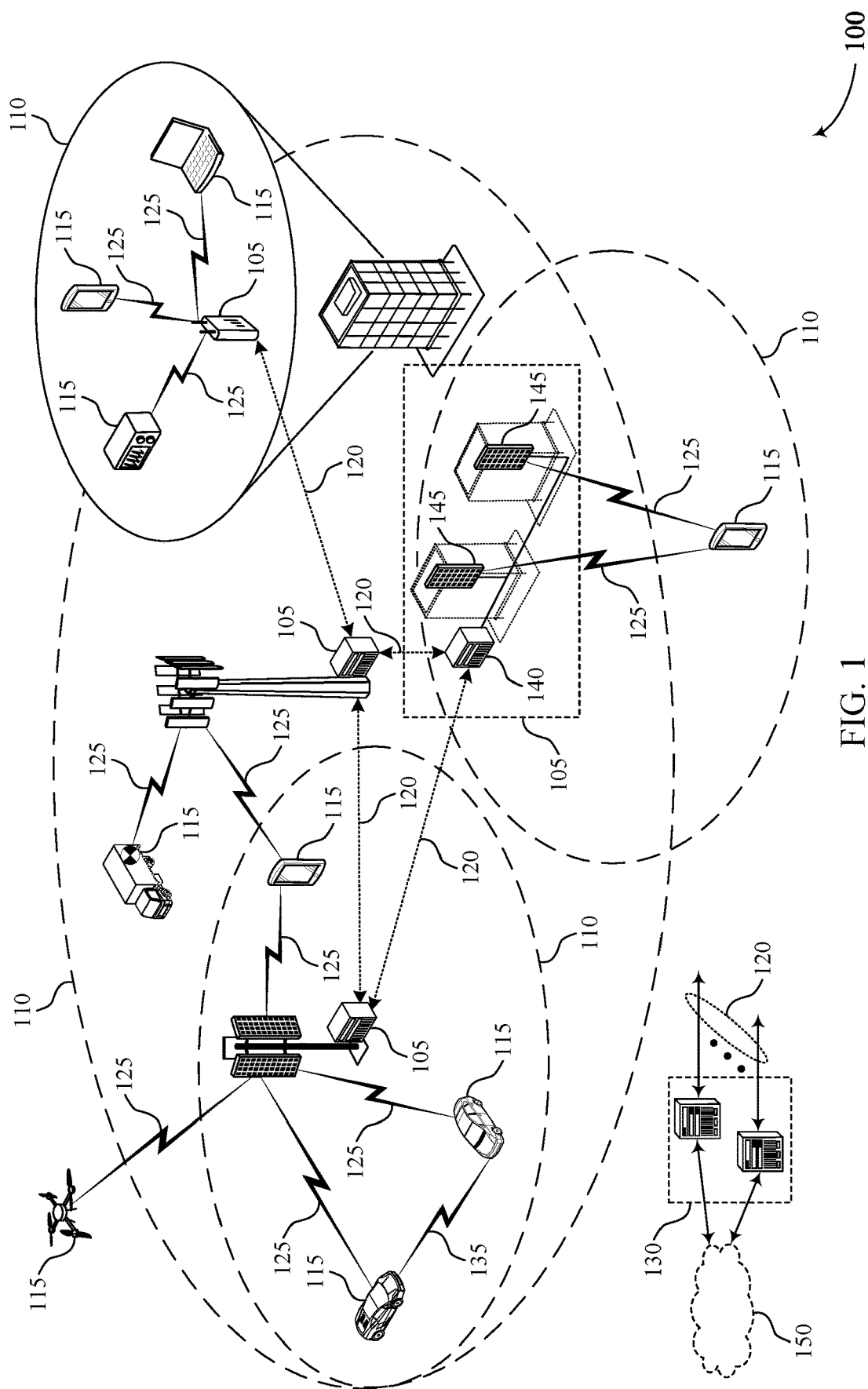
FIG. 1 illustrates an example of a wireless communications system that supports synchronization signal block prioritization for physical broadcast channel based beam measurements in accordance with aspects of the present disclosure.

The present techniques include synchronization signal block prioritization for physical broadcast channel-based beam measurements. The present techniques may enable a UE to prioritize synchronization signal blocks of a given transmission time interval (TTI) in relation to the UE performing physical broadcast channel-based beam measurements. In some cases, the TTI (e.g., slot, etc.) may be based on a frame. A frame may be configured with a duration (e.g., 10 ms duration, etc.). In some cases, a frame may include a set of subframes (e.g., 10 subframes). Each subframe may include a TTI of some length (e.g., length based on a subcarrier spacing). In some cases, a TTI may be configured with a number of OFDM symbols (e.g., 14 OFDM symbols for normal cyclic prefix (CP), or 12 OFDM symbols for extended CP).

When the number of radio frequency (RF) events (e.g., number of beam switches) within a TTI exceeds a beam switch capability limit of the UE for the TTI (e.g., limit of 14 total beam switches per TTI, limit of 12 total beam switches per TTI, etc.), then the beam measurements of some radio frequency events may be dropped for that TTI, which may result in poor system performance and poor user experience. In some cases, the number of radio frequency events corresponds to a number of beams monitored by the UE during a given TTI.

The present techniques improve system performance by prioritizing SSBs, maintaining measurements for high priority SSBs, and dropping measurements for low priority SSBs. A UE may receive control signaling configuring the UE to monitor a set of synchronization signal blocks (SSBs) during a transmission time interval (e.g., a slot), and the base station may transmit on symbols of each SSB using different beams. In some cases, the UE may determine a priority order of the SSBs when a number of radio frequency events (e.g., beam switch events) that occur during the TTI exceeds a limit of beam switches the UE is capable of performing within the TTI. In some cases, the UE may perform measurements based on some measurements being maintained and other measurements being dropped. In some cases, the UE may generate the beam measurements of the SSBs that occur during the TTI according to the priority order of the synchronization signal blocks. In some cases, the UE may transmit a beam report to a base station based on the beam measurements.

In some cases, the base station or the UE may determine which beam measurements to drop in a first TTI and which beam measurements to keep. In some cases, the UE may perform the measurements for those beam measurements that are kept. In some cases, the base station or the UE may schedule dropped beam measurements of the first TTI for measurement in a second TTI that occurs after the first TTI. In some cases, measurements may not be performed on one or more symbols of at least one SSB (e.g., PSS, or first PBCH, or SSS, or second PBCH, or any combination thereof) according to the beam measurements that are selected to be dropped (e.g., dropped for a first TTI, dropped and rescheduled for a later TTI, etc.). In some cases, measurements may not be performed on one or more SSBs according to the beam measurements that are selected to be dropped.

In some cases, the UE may receive, from a base station, control signaling that configures the UE to monitor synchronization signal blocks (e.g., during a transmission time interval). In some cases, the control signaling may be indicated via radio resource control (RRC), media access control (MAC) control element (MAC-CE), or downlink control information (DCI). In some cases, the base station may transmit configuration information (e.g., priority rules) that indicates priorities for SSBs. In some cases, the configuration information may indicate that a synchronization signal block of a serving cell has a higher priority than a synchronization signal block of a candidate cell associated with cell reselection. In some cases, the configuration information may indicate that a synchronization signal block of a serving cell and a synchronization signal block of a candidate cell each have a higher priority than one or more other synchronization signal blocks of the synchronization signal blocks of a given TTI.

Aspects of the subject matter described herein may be implemented to realize one or more advantages. The described techniques may support improvements in system efficiency such that the battery performance and system performance of a configured device is increased without clock bump-up based on prioritizing synchronization signal blocks of a given TTI for physical broadcast channel-based beam measurements. Additionally, described techniques may result in serving beam monitoring occasions being reduced, reducing a time it takes for beam refinement of synchronization signal blocks of a serving cell or candidate cell (e.g., based on measuring multiple symbols per serving SSB and/or per candidate SSB), and increasing throughput, thus improving user experience of the one or more devices with longer battery life and improved quality of service.

Aspects of the disclosure are initially described in the context of wireless communications systems. Aspects of the disclosure are further illustrated by and described with reference to synchronization signal blocks of a given TTI that relate to synchronization signal block prioritization for physical broadcast channel-based beam measurements. Aspects of the disclosure are further illustrated by and described with reference to apparatus diagrams, system diagrams, and flowcharts that relate to synchronization signal block prioritization for physical broadcast channel-based beam measurements.

FIG. 1 illustrates an example of a wireless communications system 100 that supports synchronization signal block prioritization for physical broadcast channel based beam measurements in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system.

In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may receive control signaling from a base station 105. In some cases, the control signaling may configure the UE 115 to monitor a set of synchronization signal blocks (SSBs) during a transmission time interval (e.g., a slot). In some cases, the base station 105 may use different beams to transmit on symbols of each SSB. The UE 115 may be configured to determine a priority order of the SSBs when a number of radio frequency events that occur during the TTI exceeds a limit of beam switches the UE 115 is capable of performing within the TTI. In some cases, the UE 115 may select to perform beam measurements for at least one SSB that occurs during the TTI according to the priority order of the SSBs. In some cases, the UE 115 may generate the beam measurements of the at least one SSB according to the priority order of the SSBs. In some cases, the UE 115 may transmit a beam report to the base station 105 based on the beam measurements.

Figure 2:
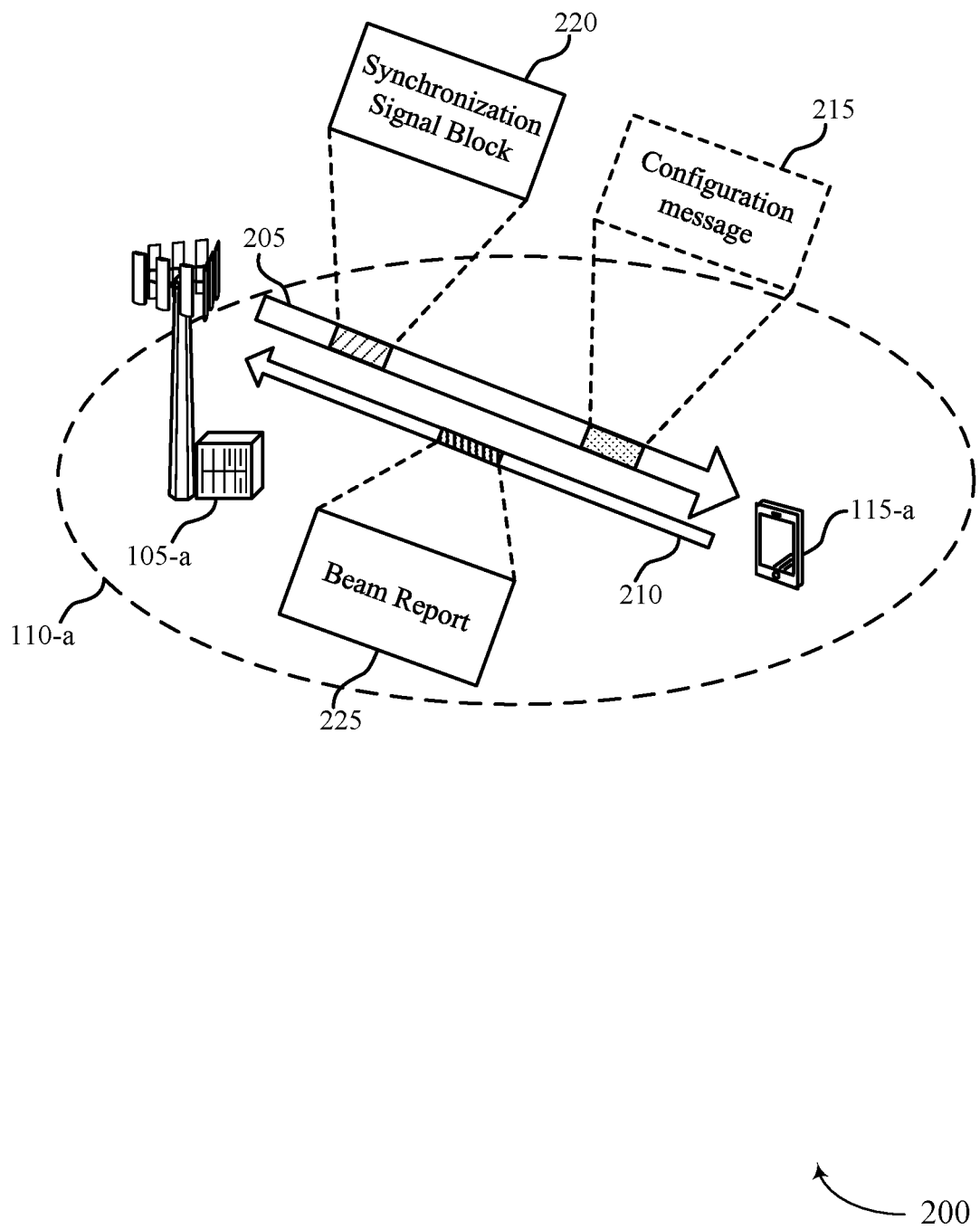
FIG. 2 illustrates an example of a wireless communications system that supports synchronization signal block prioritization for physical broadcast channel based beam measurements in accordance with aspects of the present disclosure.

FIG. 2 illustrates an example of a wireless communications system 200 that supports synchronization signal block prioritization for physical broadcast channel based beam measurements in accordance with aspects of the present disclosure.

As illustrated, wireless communications system 200 may include UE 115-a and base station 105-a, which may be examples of a UE 115 or a base station 105, as described above with reference to FIG. 1. Wireless communications system 200 may also include downlink 205 and uplink 210. Base station 105-a may use downlink 205 to convey control and/or data information to UE 115-a. And UE 115-a may use uplink 210 to convey control and/or data information to base station 105-a. In some cases, downlink 205 may use different time and/or frequency resources than uplink 210. As depicted, base station 105-a may be associated with geographic coverage area 110-a in which communications with one or more UEs (e.g., UE 115-a) is supported.

In some examples, UE 115-a may receive one or more transmissions from base station 105-a (e.g., via downlink 205). In some cases, base station 105-a may be a serving cell of UE 115-a. In some cases, base station 105-a may be a candidate cell of UE 115-a (e.g., a candidate cell associated with UE performing cell reselection). In some cases, the one or more transmissions may optionally include configuration message 215 (e.g., control signaling). In some cases, configuration message 215 may configure UE 115-a to monitor synchronization signal blocks (SSBs) during one or more transmission time intervals. In some cases, configuration message 215 may configure UE 115-a to monitor a set of synchronization signal blocks (e.g., SSB 220) during a transmission time interval.

In some examples, the one or more transmissions may include one or more synchronization signal blocks (e.g., SSB 220) for synchronization between base station 105-a and UE 115-a. In some cases, SSB 220 may be associated with or part of a synchronization signal burst set (SSBS). In some cases, base station 105-a may transmit a SSBS within a synchronization block measurement timing configuration (SMTC) window. In some cases, base station 105-a may configure UE 115-a with a SMTC window. In some cases, the SSBS may include a number of SSBs (e.g., SSB 220), each SSB being transmitted over a given beam. In some cases, information may be kept substantially similar and consistent through all SSBs in a SSBS. In some cases, each SSB may be assigned with a unique number within the SSBS. In some examples, N SSBs in a SSBS may be indexed from 0 to N−1, where N is a number greater than 1. In some cases, base station 105-a may transmit a SSBS at locations within a measurement window (e.g., SMTC window). In some cases, base station 105-a may transmit each SSB within a SSBS using a different beam direction for each SSB. In some cases, a beam index may be assigned to each beam direction.

In some cases, SSB 220 may be associated with physical broadcast channel-based beam measurements performed by UE 115-a. In some cases, the base station 105-a may use different beams to transmit on symbols of each of the one or more synchronization signal blocks. In some cases, UE 115-a may be configured to determine a priority order of the one or more synchronization signal blocks when a number of radio frequency events that occur during a TTI exceeds a beam switch limit of UE 115-a (e.g., maximum number of beam switches UE is capable of performing within a given TTI). In some cases, UE 115-a may perform beam measurements for at least one synchronization signal block of the one or more synchronization signal blocks that occurs during the TTI and that UE 115-a selects for measurement based on the determined priority of the synchronization signal block. In some cases, UE 115-a may generate the beam measurements of one or more synchronization signal blocks according to the priority order of the one or more synchronization signal blocks.

In some cases, UE 115-a may transmit beam report 225 to base station 105-a based on those beam measurements that UE 115-a performs during a first TTI according to the priority order of the one or more synchronization signal blocks. In some cases, UE 115-a may perform beam measurements during the first TTI for synchronization signal blocks with a relatively high priority, and UE 115-a may drop beam measurements during the first TTI for synchronization signal blocks with a relatively low priority. In some cases, UE 115-a may reschedule the dropped beam measurements during a second TTI that occurs after the first TTI.

The present techniques may reduce power consumption and free up processing cycles of one or more devices (e.g., battery-operated devices, a UE 115 of FIG. 1 or FIG. 2, etc.) by prioritizing synchronization signal blocks of a given TTI for physical broadcast channel-based beam measurements. Additionally, described techniques may result in serving beam monitoring occasions being reduced, reducing a time it takes for beam refinement of synchronization signal blocks of a serving cell or candidate cell (e.g., based on measuring multiple symbols per serving SSB and/or per candidate SSB), and increasing throughput, thus improving user experience of the one or more devices with longer battery life and improved quality of service. In some cases, the beam refinement process may include the UE 115 sweeping through a set of receive beams over the symbols of a given TTI (e.g., slot). In some cases, the beam refinement process may include the UE 115 determining a best receive beam of the set of receive beams. However, in some cases, the sweeping performed by the UE 115 in a particular TTI may be reduced by the beam switch capability limit of the UE 115, and one or more beam measurements may be dropped from a current TTI and rescheduled in a later TTI. In some cases, the beam refinement process may include a base station 105 sweeping over a set of transmit beams. In some cases, the set of transmit beams of the base station 105 may correspond to the set of receive beams of the UE 115. In some cases, the beam refinement process may include the UE 115 transmitting to the base station 105 a beam report that includes information regarding the best transmit beam of the base station 105. Based on the present techniques, reducing the sweeping performed by the UE 115 based on the beam switch capability limit of the UE 115 reduces the number of beams monitored by the UE 115, thus reducing the time it takes UE 115 to perform the beam refinement process.

Figure 3:
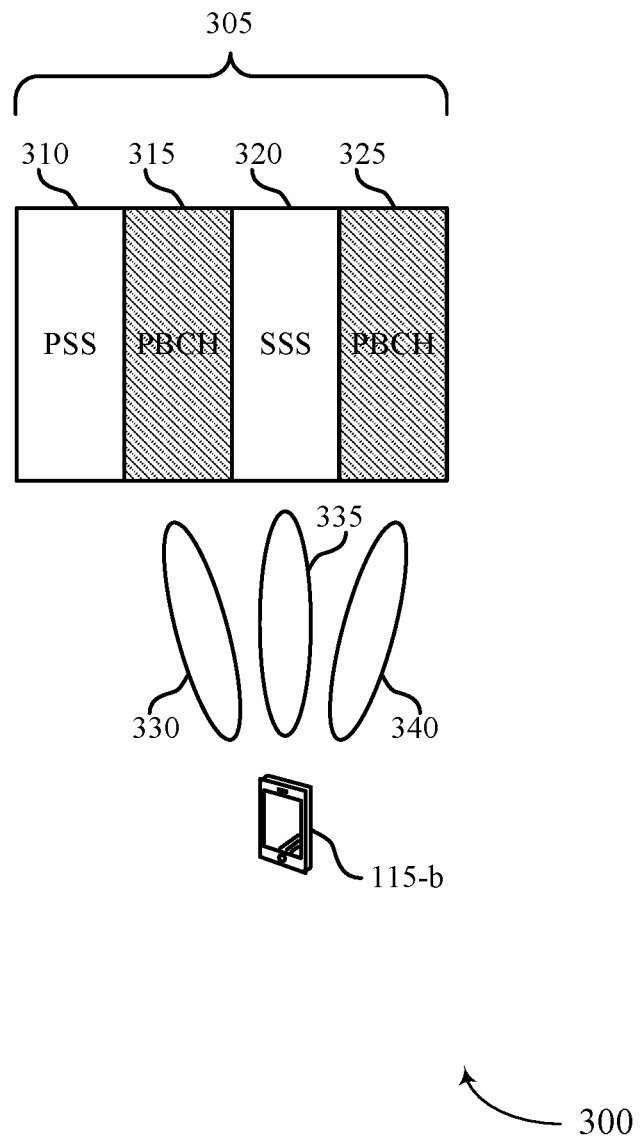
FIG. 3 illustrates an example of an environment that supports synchronization signal block prioritization for physical broadcast channel based beam measurements in accordance with aspects of the present disclosure.

FIG. 3 illustrates an example of an environment 300 that supports synchronization signal block prioritization for physical broadcast channel based beam measurements in accordance with aspects of the present disclosure.

In the illustrated example, environment 300 may include UE 115-b performing beam measurements in relation to synchronization signal block (SSB) 305. As shown, SSB 305 may include primary synchronization signal (PSS) symbol 310, first physical broadcast channel (PBCH) 315, secondary synchronization signal (SSS) symbol 320, and second PBCH symbol 325.

In some systems (e.g., legacy systems), UE 115-b may perform SSB based beam measurements on SSS symbol 320 (e.g., only on SSS symbol 320) to determine a signal measurement (e.g., a beam measurement). The signal measurement may include a reference signal received power (RSRP) measurement, or reference signal received quality (RSRQ) measurement, or received signal strength indicator (RSSI) measurement, or signal to interference plus noise ratio (SINR) measurement, or signal to noise ratio (SNR) measurement, or any combination thereof. In some systems (e.g., legacy systems), UE 115-b may measure one receive beam (e.g., only one receive beam) per SSB per slot (e.g., measure only one symbol per SSB). In some cases, SSB 305 may be part of a synchronization signal burst set (SSBS). In some systems (e.g., legacy systems), UE 115-b may measure one receive beam (e.g., only one receive beam) per SSB of the SSBS per slot (e.g., measure only one symbol per SSB per SSBS).

In some examples of the present techniques, UE 115-b may be configured to measure multiple symbols per SSB (e.g., measure two or three symbols per SSB). In some cases, UE 115-b may perform one or more beam measurements on first PBCH symbol 315 using receive beam 330 and perform one or more beam measurements on second PBCH symbol 325 using receive beam 340, in addition to performing one or more beam measurements on SSS symbol 320 using receive beam 335. Each of receive beams 330, 335, and 340 may be different receive beams each pointed in a different direction or two or more be of receive beams 330, 335, and 340 may be the same receive beam point in the same direction. Accordingly, UE 115-b may perform beam measurements on three receive beams 330, 335, and 335, of SSB 305. In some cases, each of the three receive beam measurements may include an RSRP measurement, or RSRQ measurement, or SINR measurement, or SNR measurement, or any combination thereof.

In some examples, UE 115-b may select receive beams based on receive beam timing with respect to SSB 305. In some cases, UE 115-b may rank one or more SSBs of a TTI (e.g., SSB 305) based on previous measurements (e.g., receive beam measurements of the one or more SSBs performed in one or more previous TTIs). In some cases, UE 115-b performing the beam refinement process (e.g., autonomous beam refinement (ABR)) may include UE 115-b ranking the one or more SSBs and selecting the receive beams. In some cases, UE 115-b may select one or more SSBs (e.g., SSB 305) for PBCH based beam measurements based on the respective ranks of each of the one or more SSBs (e.g., select top four ABR SSBs). In some cases, UE 115-b may select the one or more SSBs for PBCH based beam measurements based on the one or more SSBs being potential SSBs for SSB switching.

In some examples, UE 115-b may perform one or more processes associated with a dynamic beam list (DBL). In some cases, the DBL may include a list or an array of receive beams per SSB. In some cases, the DBL may be associated with an index that UE 115-b increments after every measurement request. In some cases, for each SSB of the SSBs selected by UE 115-b for beam measurements, UE 115-b may loop through the DBL at every dynamic measurement occasion. In some cases, UE 115-b may group receive beams associated with a serving cell as Group-1. In some cases, UE 115-b may group receive beams with serving cell plus neighbor cells or neighbor cells only as Group-2. In some cases, UE 115-b may loop through Group-1 beams and determine Group-1A beams and Group-1B beams. In some cases, the Group-1A beams may include those beams where the SSB timing of the received beams minus the serving receive beam timing is less than half of an associated cyclic prefix (e.g., less than +/−CP/2). In some cases, the Group-1B beams may include those beams where the SSB timing of the receive beams minus the serving receive beam timing is greater than half the associated cyclic prefix (e.g., greater than +/−CP/2). In some cases, the cyclic prefix may serve as a guard interval for beam switches between symbols (e.g., guard interval between PSS and first PBCH, between first PBCH and SSS, between SSS and second PBCH, etc.). In some cases, UE 115-b may use Group-1A beams to schedule PBCH based measurements. In some examples, beams A, D, and F of beams A, B, C, D, E, F, and G are in DBL. In some cases, when the DBL index to schedule a next beam is at A and A is a Group-1A beam, when UE 115-b may determine another two Group-1A beams and schedule accordingly. In some cases, when the DBL index to schedule a next beam is at A and A is a non-Group-1A beam, then UE 115-b may schedule beam A based on a legacy scheduling process.

Figure 4:
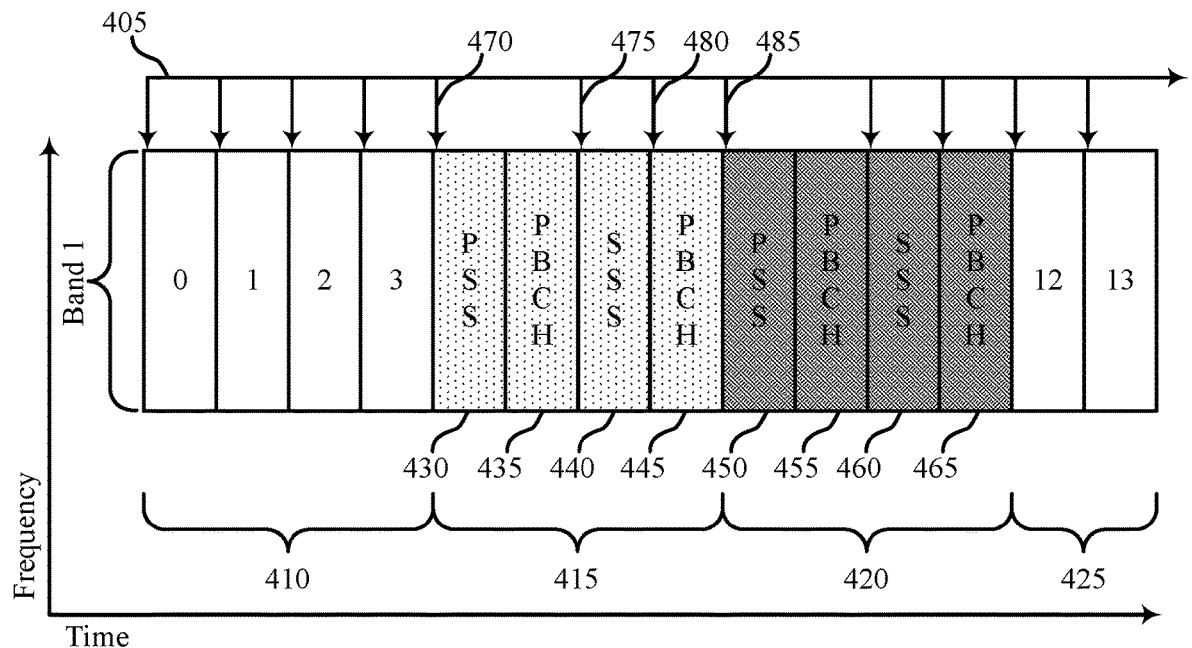
FIG. 4 illustrates an example of a transmission time interval that supports synchronization signal block prioritization for physical broadcast channel based beam measurements in accordance with aspects of the present disclosure.

FIG. 4 illustrates an example of a transmission time interval 400 that supports synchronization signal block prioritization for physical broadcast channel based beam measurements in accordance with aspects of the present disclosure.

In the illustrated example, the transmission time interval 400 may include multiple symbols. As shown, the transmission time interval 400 may include 14 symbols. In some cases, a transmission time interval (e.g., transmission time interval 400) may include up to 2 SSBs for some subcarrier spacings (e.g., 120 kHz SCS). As shown, the 14 symbols of transmission time interval 400 may include data/control symbols 410, symbols of a first SSB 415, symbols of a second SSB 420, and data/control symbols 425. The first SSB 415 may include a PSS symbol 430, a first PBCH symbol 435, an SSS symbol 440, and a second PBCH symbol 445. The second SSB 420 may include a PSS symbol 450, a first PBCH symbol 455, an SSS symbol 460, and a second PBCH symbol 465.

In the illustrated example, a set of beam switches 405 (e.g., radio frequency events) may occur between at least one symbol to the following symbol of transmission time interval 400. In some cases, a beam switch may occur based on a configuration of a UE. Beam switches 405 may represent the radio frequency switches (e.g., switching antenna configurations, switching antennas used, etc.) that a UE makes in performing beam measurements from one beam to the next, where the UE changes from one receive beam to a different receive beam at each beam switch event. As shown, beam switches 405 may include 12 beam switches.

In some examples, transmission time interval 400 may be associated with a subcarrier spacing (SCS). In some cases, transmission time interval 400 may be associated with a 15 kHz SCS, 30 kHz SCS, 60 kHz SCS, 120 kHz SCS, or 240 kHz SCS. Additionally, or alternatively, transmission time interval 400 may be associated with a clock mode of a related UE. In some cases, the UE may have a beam switch limit, indicating the number of beam switches the UE is capable of making with a defined transmission time interval (e.g., slot). In some cases, the beam switch limit may be based on the clock mode of the UE. In some cases, the clock mode includes at least a first clock mode and a second clock mode (e.g., at least a high clock mode and a low clock mode that is slower than the high clock mode). In some cases, the clock mode may include a clock speed or clock rate of the UE. In some cases, one or more operations or processes of the UE may be executed according to the clock mode (e.g., at the clock speed, at the clock rate) of the UE. In some cases, one or more operations or processes of the UE may be synchronized according to the clock mode of the UE. In some cases, a first clock mode may correspond to a first beam switch limit (e.g., 14 beam switches per transmission time interval). In some cases, a second clock mode may correspond to a second beam switch limit (e.g., 12 beam switches per transmission time interval).

In some examples, the UE may be configured with a beam measurement configuration that indicates the limit of beam switches that the UE may perform within a given transmission time interval (e.g., transmission time interval 400). For the subcarrier spacing associated with transmission time interval 400 (e.g., 120 kHz SCS), the beam switch limit of the UE may be capable of performing 12 beam switches per transmission time interval.

In some examples, the UE may be configured to perform beam measurements based on the beam switch limit. In some cases, the UE may be configured to measure a beam associated with first PBCH symbol 435, a beam associated with SSS symbol 440, and a beam associated with second PBCH symbol 445, but not with PSS symbol 430 (e.g., 3 beam measurements for first SSB 415). In some cases, the UE may be configured to measure a beam associated with first PBCH symbol 455, a beam associated with SSS symbol 460, and a beam associated with second PBCH symbol 465, but not with PSS symbol 450 (e.g., 3 beam measurements for second SSB 420). Accordingly, beam switch 470 may occur between symbol 3 of data/control symbols 410 and PSS symbol 430. However, no beam switch may occur between PSS symbol 430 and first PBCH symbol 435 (e.g., based on the UE beam measurement configuration). Also, beam switch 475 may occur between first PBCH symbol 435 and SSS symbol 440, beam switch 480 may occur between SSS symbol 440 and second PBCH symbol 445, and beam switch 485 may occur between second PBCH symbol 445 of first SSB 415 and PSS symbol 450 of second SSB 420, while no beam switch may occur between PSS symbol 450 and first PBCH symbol 455 (e.g., based on the UE beam measurement configuration). Thus, with 14 symbols of transmission time interval 400 and beam switches not occurring between PSS symbol 430 and first PBCH symbol 435, and between PSS symbol 450 and first PBCH symbol 455, the beam switches 405 does not exceed the beam switch limit of 12 switches per transmission time interval.

Figure 5:
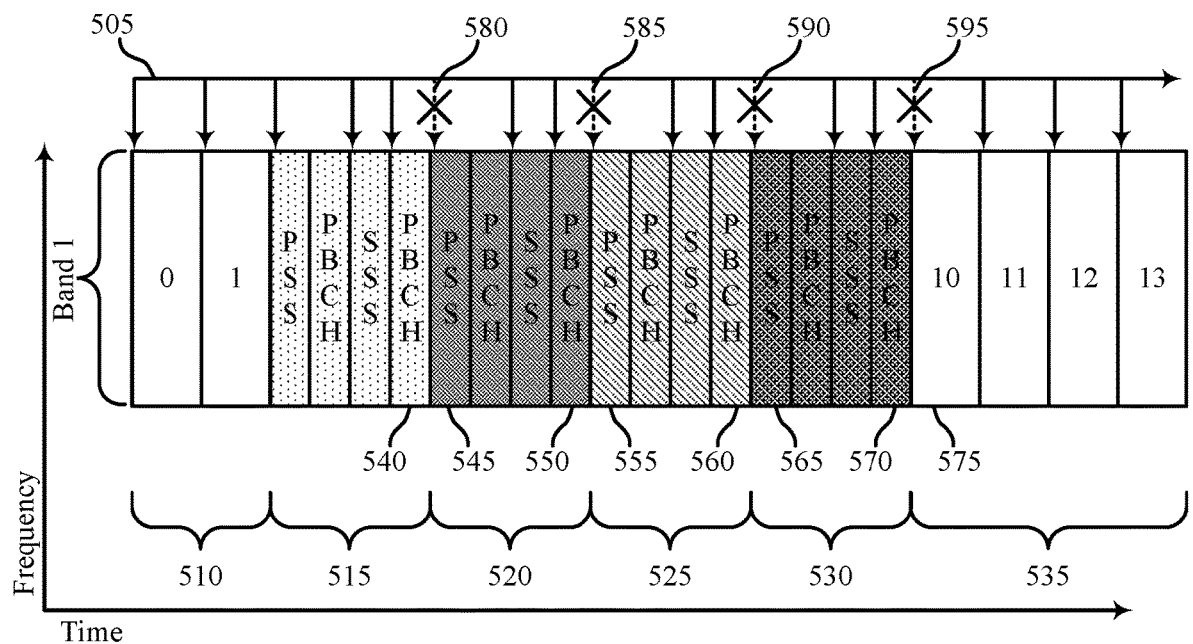
FIG. 5 illustrates an example of a transmission time interval that supports synchronization signal block prioritization for physical broadcast channel based beam measurements in accordance with aspects of the present disclosure.

FIG. 5 illustrates an example of a transmission time interval 500 that supports synchronization signal block prioritization for physical broadcast channel based beam measurements in accordance with aspects of the present disclosure.

In the illustrated example, transmission time interval 500 may include data/control symbols 510, a first SSB 515, a second SSB 520, a third SSB 525, a fourth SSB 530, and data/control symbols 535. In some cases, a transmission time interval (e.g., transmission time interval 500) may include up to 4 SSBs for some subcarrier spacings (e.g., 240 kHz SCS).

Since a first transmission time interval based on a first subcarrier spacing (e.g., transmission time interval 500 based on a 240 kHz SCS) may include up to two more SSBs than a second transmission time interval based on a second subcarrier spacing (e.g., transmission time interval 400 based on a 120 kHz SCS), and because a UE may be configured to perform three beam switches per SSB, a UE may be expected to perform six additional beam switches on the first transmission time interval compared to the second transmission time interval.

Accordingly, because of the increased number of SSBs that a transmission time interval may include based on a 240 kHz SCS, the number of expected beam switches for the transmission time interval may increase to 18, compared to 12 for the 120 kHz SCS transmission time interval. Since there are 18 expected beam switches, 4 of the 18 expected beam switches may be dropped to satisfy a limit of 14 beam switches per slot, or 6 of the 18 expected beam switches may be dropped to satisfy a limit of 12 beam switches per slot.

In some cases, when the number of radio frequency events in transmission time interval 500 exceed a beam switch limit of a UE (e.g., 14 or 12 total beam switches per transmission time interval), then some beam measurements of transmission time interval 500 may get dropped. In some cases, the UE (e.g., firmware of the UE) may indicate to a beam management process (e.g., management layer 1 (ML1)) which beams of transmission time interval 500 to drop. Thus, no measurements may be performed on one or more symbols of the SSBs of transmission time interval 500 based on the beam measurements that are dropped. In some cases, measurements may be performed on one or more symbols of relatively high priority SSBs, while no measurements may be performed on any symbol of a relatively low priority SSB. In some cases, the beam management process (e.g., ML1) may schedule the dropped beams in a transmission time interval subsequent to transmission time interval 500.

In some examples, the beam switch limit of a UE associated with transmission time interval 500 may be set at 14 beam switches (e.g., measuring beams for 14 radio frequency events per slot). In some cases, such as low power modes due to low clock speeds (e.g., based on the clock mode of the UE), the beam switch limit of the UE may be 12 beam switches, permitting the UE to perform up to 12 beam switches per transmission time interval. Hence, the UE may be capable of measuring using up to 12 different receive beam per slot.

In some examples, the UE may discard beam measurements for one or more particular symbols of an SSB when the beam switch limit of the UE is exceeded. In some cases, the UE may discard beam measurements of one or more symbols of an SSB based on the priority of the SSBs in a given TTI (e.g., transmission time interval 500). In some cases, the UE may discard beam measurements of an SSB based on the priority of the SSBs in a given TTI (e.g., discard beam measurements of all of the symbols of at least one low priority SSB of a given TTI). In some cases, the UE may discard beam measurements of the second PBCH symbol for low priority SSBs (e.g., low power SSBs and low signal quality SSBs among the non-serving cell SSBs and non-candidate SSBs). Accordingly, to reduce the number of beam switches of a given SSB, no beam switch may be performed at the second PBCH of the given SSB, resulting in one less beam switch occurring for the given SSB. In some cases, the second PBCH of a given SSB gets measured with the SSS of the given SSB that precedes the second PBCH.

In some examples, the UE may perform beam measurements based on a priority order of the SSBs indicated by one or more priority rules. In some cases, the UE may receive (e.g., from a base station, from another UE in a sidelink communication, etc.) a control message that indicates at least one of the one or more priority rules. In some cases, the control message (or one or more control messages) may indicate the one or more priority rules for determining the priority order of the synchronization signal blocks, the beam switch events that occur during the transmission time interval 500, a subcarrier spacing of transmission time interval 500, or any combination thereof.

In some examples, the priority rule may indicate that a synchronization signal block of a serving cell has a higher priority than a synchronization signal block of a candidate cell associated with cell reselection. In some cases, the priority rule may indicate that a synchronization signal block of a serving cell and a synchronization signal block of a candidate cell each have a higher priority than one or more other synchronization signal blocks of the synchronization signal blocks of transmission time interval 500. In some cases, the priority rule may indicate that a first synchronization signal block having a higher signal quality metric is prioritized over a second synchronization signal block having a lower signal quality metric. In some cases, the signal quality metric of the one or more other SSBs may be determined based on one or more measurements performed on a prior SSB. The signal quality may refer to reference signal received power metrics, or reference signal received quality metrics, or received signal strength indicator metrics, or signal to interference plus noise ratio metrics, or signal to noise ratio metrics, or any combination thereof.

In some examples, first SSB 515 may be an SSB of a serving cell, third SSB 525 may be an SSB of a candidate cell, while second SSB 520 and fourth SSB 530 may be of non-serving and non-candidate cells. Accordingly, first SSB 515 may have the highest priority based on first SSB 515 being of a serving cell, and third SSB 525 may have the second highest priority based on third SSB 525 being of a candidate cell. The UE may determine that fourth SSB 530 is associated with a higher signal quality than second SSB 520. Accordingly, fourth SSB 530 may have the third highest priority, and second SSB 520 may have the lowest priority based on fourth SSB 530 being associated with a higher signal quality.

In the illustrated example, the UE may not perform beam switches at each of 580, 585, 590, and 595 so that the number of beam switches does not exceed the beam switch capability limit of the UE for transmission time interval 500. To satisfy its beam switch limit (e.g., 14 beam switches for transmission time interval 500), the UE may first drop the beam measurement 585 for second PBCH 550 of second SSB 520 since second SSB 520 has the lowest priority, then drop the beam measurement 595 for second PBCH 570 of fourth SSB 530 since fourth SSB 530 has the third highest priority, then drop the beam measurement 590 for second PBCH 560 of third SSB 525 since third SSB 525 has the second highest priority, then drop the beam measurement 580 for second PBCH 540 of first SSB 515 since first SSB 515 has the highest priority. Because the UE does not perform beam switch 580, the UE uses the same receive beam to receive symbols 540 and 545. Similarly, because the UE does not perform beam switches 585, 590, and 595, the UE uses the same respective receive beam to receive symbols 550 and 555, the same respective receive beam to receive symbols 560 and 565, and the same respective receive beam to receive symbols 570 and 575. When the same receive beam is used to receive during a current symbol as was used as in a prior symbol instead of switching to a different receive beam, the UE may drop performing a beam measurement during the current symbol. The UE may subsequently reschedule a measurement using the different receive beam in a subsequent TTI (e.g., a later slot).

Accordingly, when there are more beam switches in a transmission time interval (e.g., transmission time interval 500) than the UE is capable of performing, the UE selects a subset of the total number of SSBs of a transmission time interval to monitor. In some cases, the UE may not perform a beam switch at a particular symbol of an SSB (e.g., at a second PBCH symbol, or at a first PBCH symbol, or at an SSS symbol, etc.). In other cases, the UE may not perform a beam switch for multiple symbols or any of the symbols of a low priority SSB (e.g., none of the symbols of second SSB 520). When beam switching is not performed for any of the symbols of second SSB 520, then second SSB 520 may be received using the same receive beam that the UE uses to measure the last symbol of the prior SSB in time (e.g., receive beam used to measure the last symbol of first SSB 525). Thus, the UE may perform multiple beam measurements of at least a subset of the symbols of the SSBs or a subset of the SSBs that occur during the transmission time interval 500 according to the priority order of the multiple SSBs.

In some examples, the UE may transmit a beam report to a base station. In some cases, the beam report may be based on the multiple beam measurements the UE performs of the at least subset of the symbols of the SSBs or the subset of the SSBs of transmission time interval 500 according to the priority order of the multiple SSBs. In some cases, the UE may transmit the beam report requesting that the base station transmit using a first transmission beam of multiple available transmission beams, where the multiple beam measurements are measurements of the multiple available transmission beams.

Figure 6:
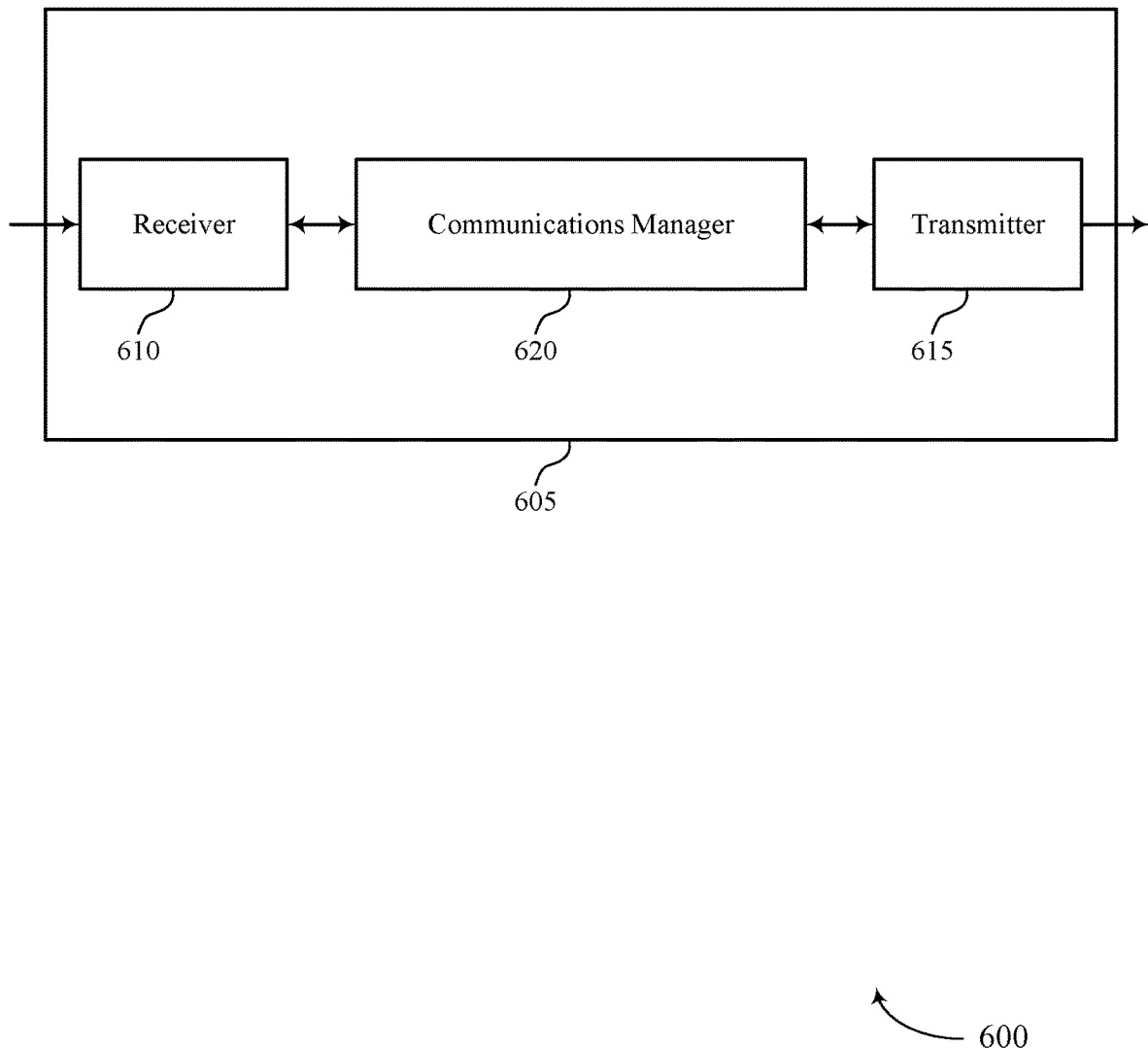
FIGS. 6 and 7 show block diagrams of devices that support synchronization signal block prioritization for physical broadcast channel based beam measurements in accordance with aspects of the present disclosure.

FIG. 6 shows a block diagram 600 of a device 605 that supports synchronization signal block prioritization for physical broadcast channel based beam measurements in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to synchronization signal block prioritization for physical broadcast channel based beam measurements). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to synchronization signal block prioritization for physical broadcast channel based beam measurements). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of synchronization signal block prioritization for physical broadcast channel based beam measurements as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving control signaling indicating for the UE to monitor a set of multiple synchronization signal blocks during a first transmission time interval. The communications manager 620 may be configured as or otherwise support a means for determining a priority order of the set of multiple synchronization signal blocks based on a number of beam switch events that occur during the first transmission time interval exceeding a beam switch capability limit of the UE. The communications manager 620 may be configured as or otherwise support a means for performing a set of multiple beam measurements of at least a subset of the set of multiple synchronization signal blocks that occur during the first transmission time interval according to the priority order of the set of multiple synchronization signal blocks. The communications manager 620 may be configured as or otherwise support a means for transmitting a beam report to a base station based on the set of multiple beam measurements.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for improving wireless device system efficiency such that the battery performance and system performance of a configured device is increased without clock bump-up based on prioritizing synchronization signal blocks of a given TTI for physical broadcast channel-based beam measurements. Additionally, described techniques may result in reduced processing, reduced power consumption, more efficient utilization of communication resources, thus improving user experience of the one or more devices with longer battery life and improved quality of service.

Figure 7:
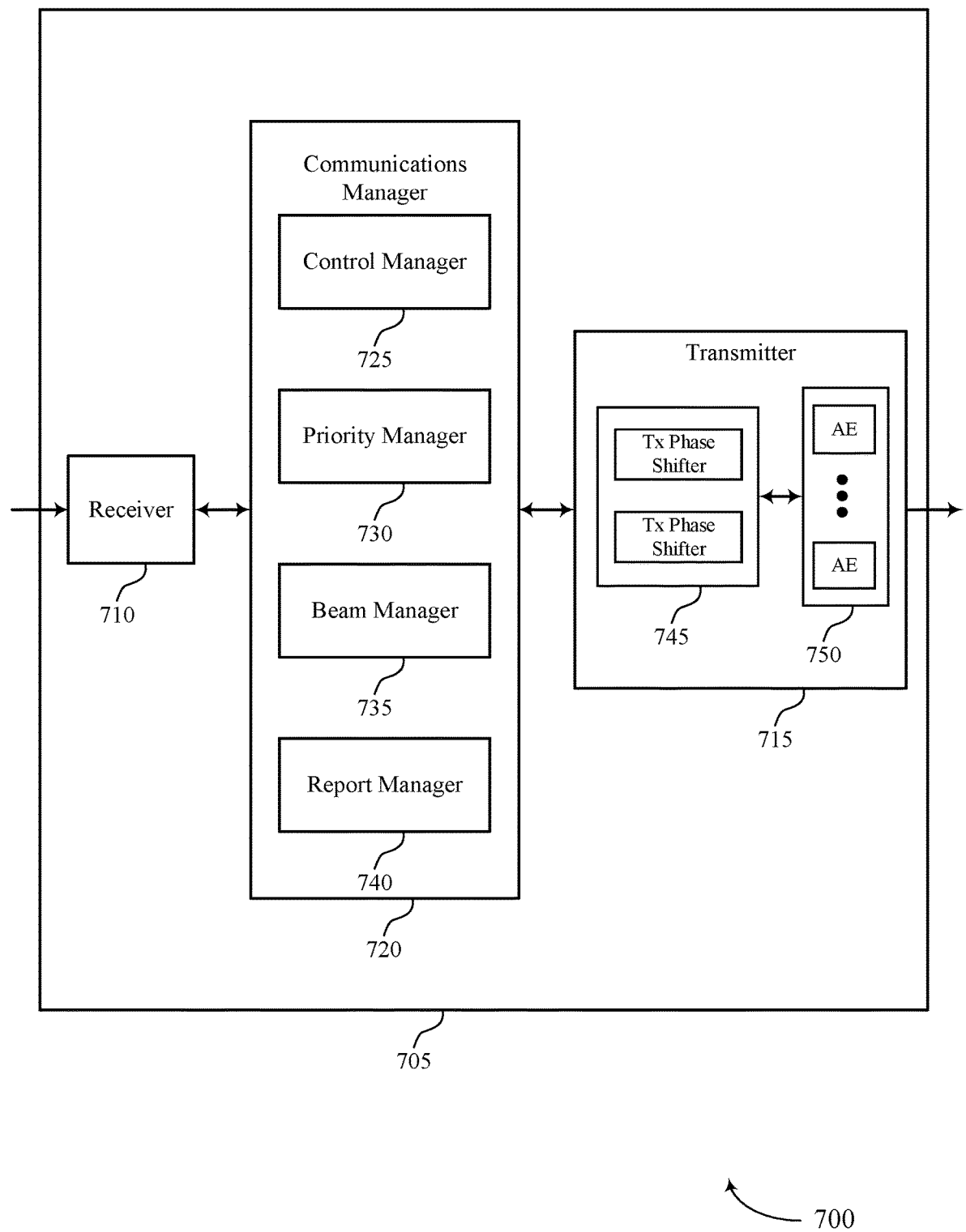

FIG. 7 shows a block diagram 700 of a device 705 that supports synchronization signal block prioritization for physical broadcast channel based beam measurements in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to synchronization signal block prioritization for physical broadcast channel based beam measurements). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to synchronization signal block prioritization for physical broadcast channel based beam measurements). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of synchronization signal block prioritization for physical broadcast channel based beam measurements as described herein. For example, the communications manager 720 may include a control manager 725, a priority manager 730, a beam manager 735, a report manager 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The control manager 725 may be configured as or otherwise support a means for receiving control signaling indicating for the UE to monitor a set of multiple synchronization signal blocks during a first transmission time interval. The priority manager 730 may be configured as or otherwise support a means for determining a priority order of the set of multiple synchronization signal blocks based on a number of beam switch events that occur during the first transmission time interval exceeding a beam switch capability limit of the UE. The beam manager 735 may be configured as or otherwise support a means for performing a set of multiple beam measurements of at least a subset of the set of multiple synchronization signal blocks that occur during the first transmission time interval according to the priority order of the set of multiple synchronization signal blocks. The report manager 740 may be configured as or otherwise support a means for transmitting a beam report to a base station based on the set of multiple beam measurements.

A phase shifter 745 may provide a configurable phase shift or phase offset to a corresponding radio frequency signal to be transmitted on a respective antenna element 750. The settings of each of the phase shifters 745 may be independent, meaning that each can be set to provide a desired amount of phase shift or the same amount of phase shift or some other configuration. A modem or other processor may have at least one control line connected to each of the phase shifters 745 and which may be used to configure the phase shifters 745 to provide a desired amounts of phase shift or phase offset between antenna elements 750.

In at least one embodiment, changing or receiving a transmit or receive beam comprises adjusting relative phase shifts for signals on different antenna elements 750. The relative phase shifts may be achieved by the modem adjusting the phase shift of the one or more phase shifters 745. The set of phases for different phase shifters 745 (and corresponding antenna elements 750) may comprise the spatial receive parameters or spatial transmit parameters for a respective beam. To receive or transmit on a beam, the spatial parameters may need to be set before the beginning of the transmitting or receiving.

Figure 8:
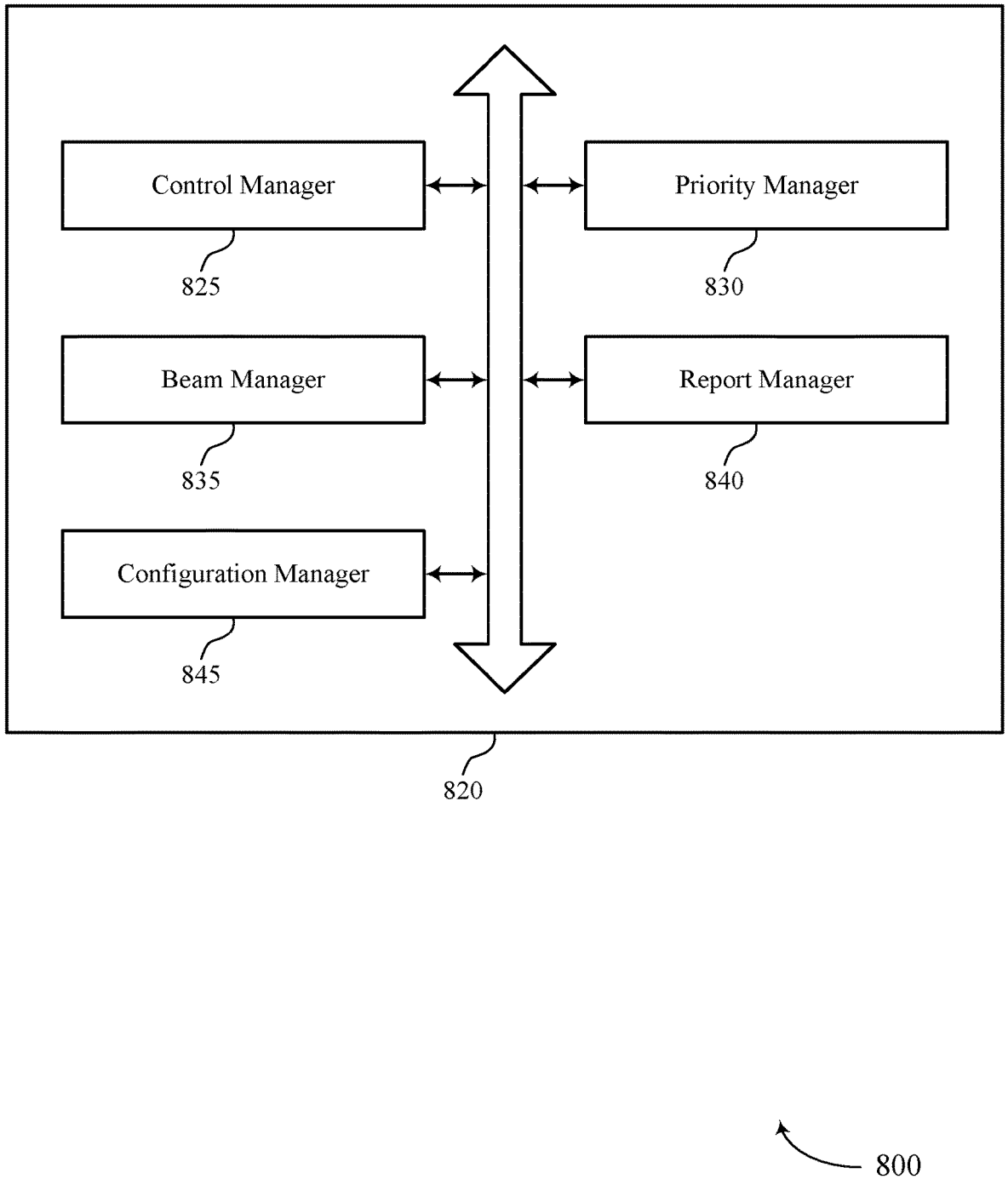
FIG. 8 shows a block diagram of a communications manager that supports synchronization signal block prioritization for physical broadcast channel based beam measurements in accordance with aspects of the present disclosure.

FIG. 8 shows a block diagram 800 of a communications manager 820 that supports synchronization signal block prioritization for physical broadcast channel based beam measurements in accordance with aspects of the present disclosure. The communications manager 820 may be an example of aspects of a communications manager 620, a communications manager 720, or both, as described herein. The communications manager 820, or various components thereof, may be an example of means for performing various aspects of synchronization signal block prioritization for physical broadcast channel based beam measurements as described herein. For example, the communications manager 820 may include a control manager 825, a priority manager 830, a beam manager 835, a report manager 840, a configuration manager 845, or any combination thereof. Each of these components may communicate, directly or indirectly, with one another (e.g., via one or more buses).

The communications manager 820 may support wireless communication at a UE in accordance with examples as disclosed herein. The control manager 825 may be configured as or otherwise support a means for receiving control signaling indicating for the UE to monitor a set of multiple synchronization signal blocks during a first transmission time interval. The priority manager 830 may be configured as or otherwise support a means for determining a priority order of the set of multiple synchronization signal blocks based on a number of beam switch events that occur during the first transmission time interval exceeding a beam switch capability limit of the UE. The beam manager 835 may be configured as or otherwise support a means for performing a set of multiple beam measurements of at least a subset of the set of multiple synchronization signal blocks that occur during the first transmission time interval according to the priority order of the set of multiple synchronization signal blocks. The report manager 840 may be configured as or otherwise support a means for transmitting a beam report to a base station based on the set of multiple beam measurements.

In some examples, transmitting the beam report requesting that the base station transmit using a first transmission beam of a set of multiple available transmission beams, where the set of multiple beam measurements are measurements of the set of multiple available transmission beams.

In some examples, the priority manager 830 may be configured as or otherwise support a means for identifying a priority rule for determining the priority order of the synchronization signal blocks, the priority rule indicating that a synchronization signal block of a serving cell has a higher priority than a synchronization signal block of a candidate cell associated with cell reselection.

In some examples, the priority manager 830 may be configured as or otherwise support a means for identifying a priority rule for determining the priority order of the synchronization signal blocks, the priority rule indicating that a synchronization signal block of a serving cell and a synchronization signal block of a candidate cell each have a higher priority than one or more other synchronization signal blocks of the set of multiple synchronization signal blocks.

In some examples, the priority manager 830 may be configured as or otherwise support a means for identifying a priority rule for determining the priority order of the synchronization signal blocks, the priority rule indicating that a first synchronization signal block having a higher signal quality metric is prioritized over a second synchronization signal block having a lower signal quality metric.

In some examples, the priority manager 830 may be configured as or otherwise support a means for performing a measurement of a first signal quality metric of the first synchronization signal block and a second signal quality metric of the second synchronization signal block that occur during a second transmission time interval that precedes the first transmission time interval.

In some examples, the first and second signal quality metrics are reference signal received power metrics, or reference signal received quality metrics, or received signal strength indicator metrics, or signal to interference plus noise ratio metrics, or signal to noise ratio metrics, or any combination thereof.

In some examples, the priority manager 830 may be configured as or otherwise support a means for rescheduling beam measurement of a physical broadcast channel of the first synchronization signal block from the first transmission time interval to a second transmission time interval that occurs after the first transmission time interval based on the priority order. In some examples, the priority manager 830 may be configured as or otherwise support a means for performing a beam measurement of the physical broadcast channel of the first synchronization signal block based on the rescheduling.

In some examples, the configuration manager 845 may be configured as or otherwise support a means for identifying a priority rule for determining the priority order of the synchronization signal blocks, the beam switch events that occur during the first transmission time interval, a subcarrier spacing of the first transmission time interval, or any combination thereof. In some examples, each of the synchronization signal blocks includes a primary synchronization signal, a first physical broadcast channel, a secondary synchronization signal, and a second physical broadcast channel.

In some examples, the configuration manager 845 may be configured as or otherwise support a means for dropping a beam measurement of the second physical broadcast channel of at least one of the synchronization signal blocks based on the priority order. In some examples, the configuration manager 845 may be configured as or otherwise support a means for dropping a beam measurement of the second physical broadcast channel of a first synchronization signal block of the synchronization signal blocks before dropping a beam measurement of the second physical broadcast channel of a second synchronization signal block of the synchronization signal blocks based on the priority order indicating that a priority of the first synchronization signal block is less than a priority of the second synchronization signal block.

In some examples, the configuration manager 845 may be configured as or otherwise support a means for dropping performing a beam measurement of a physical broadcast channel of a first synchronization signal block of the set of multiple synchronization signal blocks based on the priority order of the synchronization signal blocks.

In some examples, the beam switch capability limit is based on a clock mode of the UE. In some examples, the number of beam switch events that occur during the first transmission time interval are based on a number of synchronization signal blocks that occur during the first transmission time interval. In some examples, the number of beam switch events correspond to a number of beams monitored by the UE during the first transmission time interval.

Figure 9:
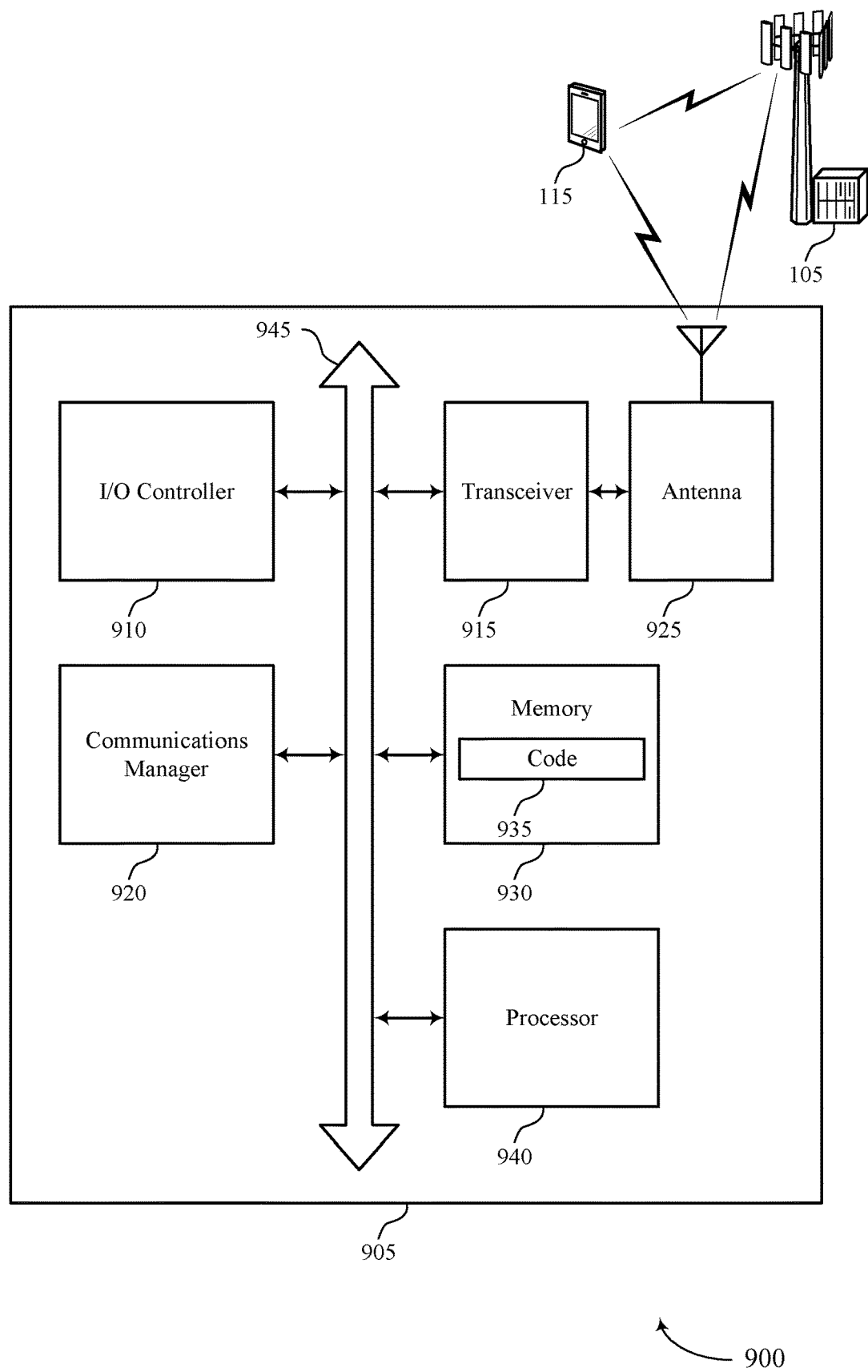
FIG. 9 shows a diagram of a system including a device that supports synchronization signal block prioritization for physical broadcast channel based beam measurements in accordance with aspects of the present disclosure.

FIG. 9 shows a diagram of a system 900 including a device 905 that supports synchronization signal block prioritization for physical broadcast channel based beam measurements in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting synchronization signal block prioritization for physical broadcast channel based beam measurements). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving control signaling indicating for the UE to monitor a set of multiple synchronization signal blocks during a first transmission time interval. The communications manager 920 may be configured as or otherwise support a means for determining a priority order of the set of multiple synchronization signal blocks based on a number of beam switch events that occur during the first transmission time interval exceeding a beam switch capability limit of the UE. The communications manager 920 may be configured as or otherwise support a means for performing a set of multiple beam measurements of at least a subset of the set of multiple synchronization signal blocks that occur during the first transmission time interval according to the priority order of the set of multiple synchronization signal blocks. The communications manager 920 may be configured as or otherwise support a means for transmitting a beam report to a base station based on the set of multiple beam measurements.

By including or configuring the communications manager 920 in accordance with examples as described herein, the device 905 may support techniques for improving wireless device system efficiency such that the battery performance and system performance of a configured device is increased without clock bump-up based on prioritizing synchronization signal blocks of a given TTI for physical broadcast channel-based beam measurements. Additionally, described techniques may result in improved communication reliability, reduced latency, improved user experience related to reduced processing, reduced power consumption, more efficient utilization of communication resources, improved coordination between devices, longer battery life, improved utilization of processing capability, thus improving user experience of the one or more devices with longer battery life and improved quality of service.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of synchronization signal block prioritization for physical broadcast channel based beam measurements as described herein, or the processor 940 and the memory 930 may be otherwise configured to perform or support such operations.

Figure 10:
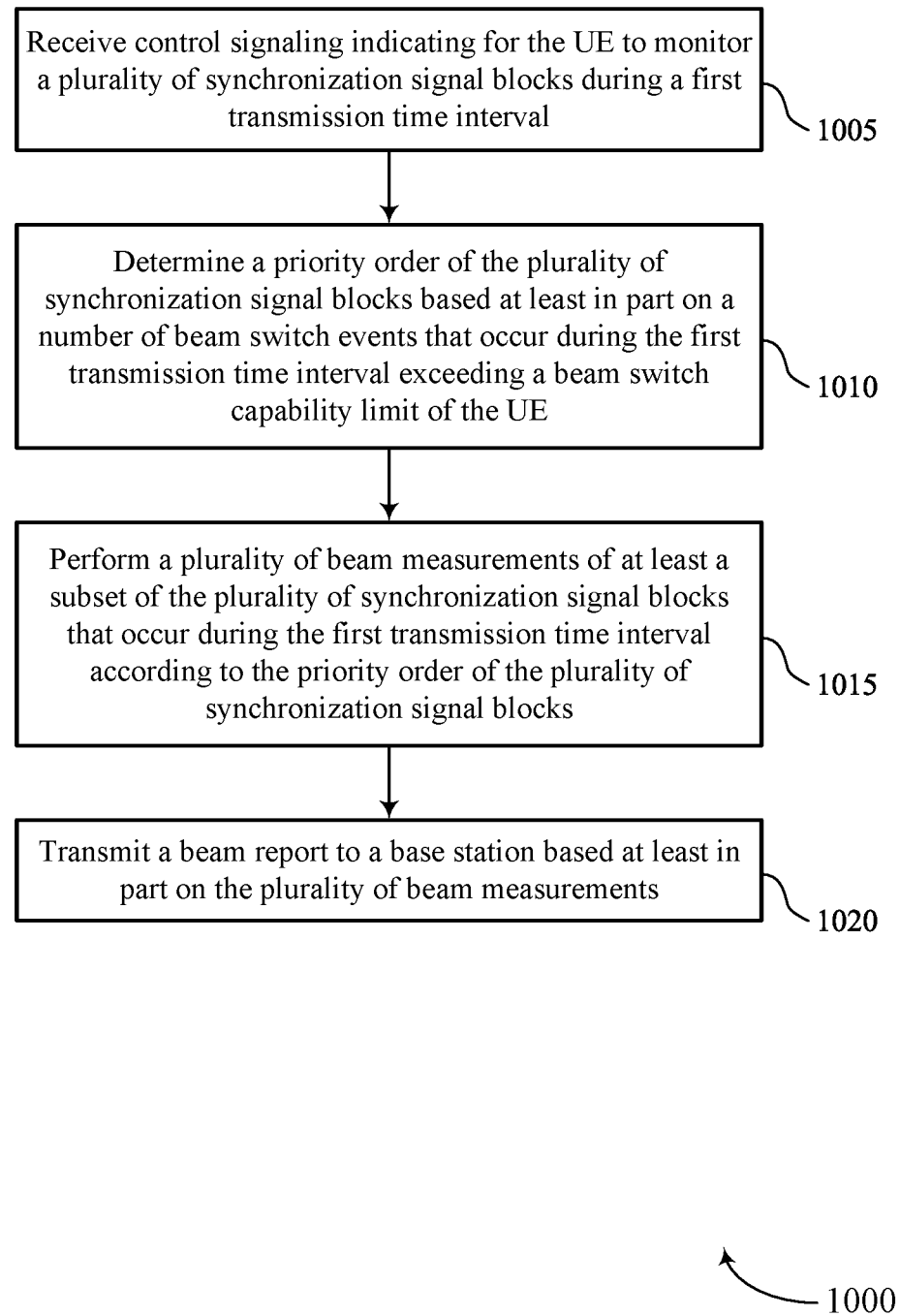
FIGS. 10 and 11 show flowcharts illustrating methods that support synchronization signal block prioritization for physical broadcast channel based beam measurements in accordance with aspects of the present disclosure.

FIG. 10 shows a flowchart illustrating a method 1000 that supports synchronization signal block prioritization for physical broadcast channel based beam measurements in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include receiving control signaling indicating for the UE to monitor a set of multiple synchronization signal blocks during a first transmission time interval. The operations of 1005 may be performed in accordance with examples as disclosed herein. In some examples, aspects of the operations of 1005 may be performed by a control manager 825 as described with reference to FIG. 8.

At 1010, the method may include determining a priority order of the set of multiple synchronization signal blocks based on a number of beam switch events that occur during the first transmission time interval exceeding a beam switch capability limit of the UE. The operations of 1010 may be performed in accordance with examples as disclosed herein. In some examples, aspects of the operations of 1010 may be performed by a priority manager 830 as described with reference to FIG. 8.

At 1015, the method may include performing a set of multiple beam measurements of at least a subset of the set of multiple synchronization signal blocks that occur during the first transmission time interval according to the priority order of the set of multiple synchronization signal blocks. The operations of 1015 may be performed in accordance with examples as disclosed herein. In some examples, aspects of the operations of 1015 may be performed by a beam manager 835 as described with reference to FIG. 8.

At 1020, the method may include transmitting a beam report to a base station based on the set of multiple beam measurements. The operations of 1020 may be performed in accordance with examples as disclosed herein. In some examples, aspects of the operations of 1020 may be performed by a report manager 840 as described with reference to FIG. 8.

Figure 11:
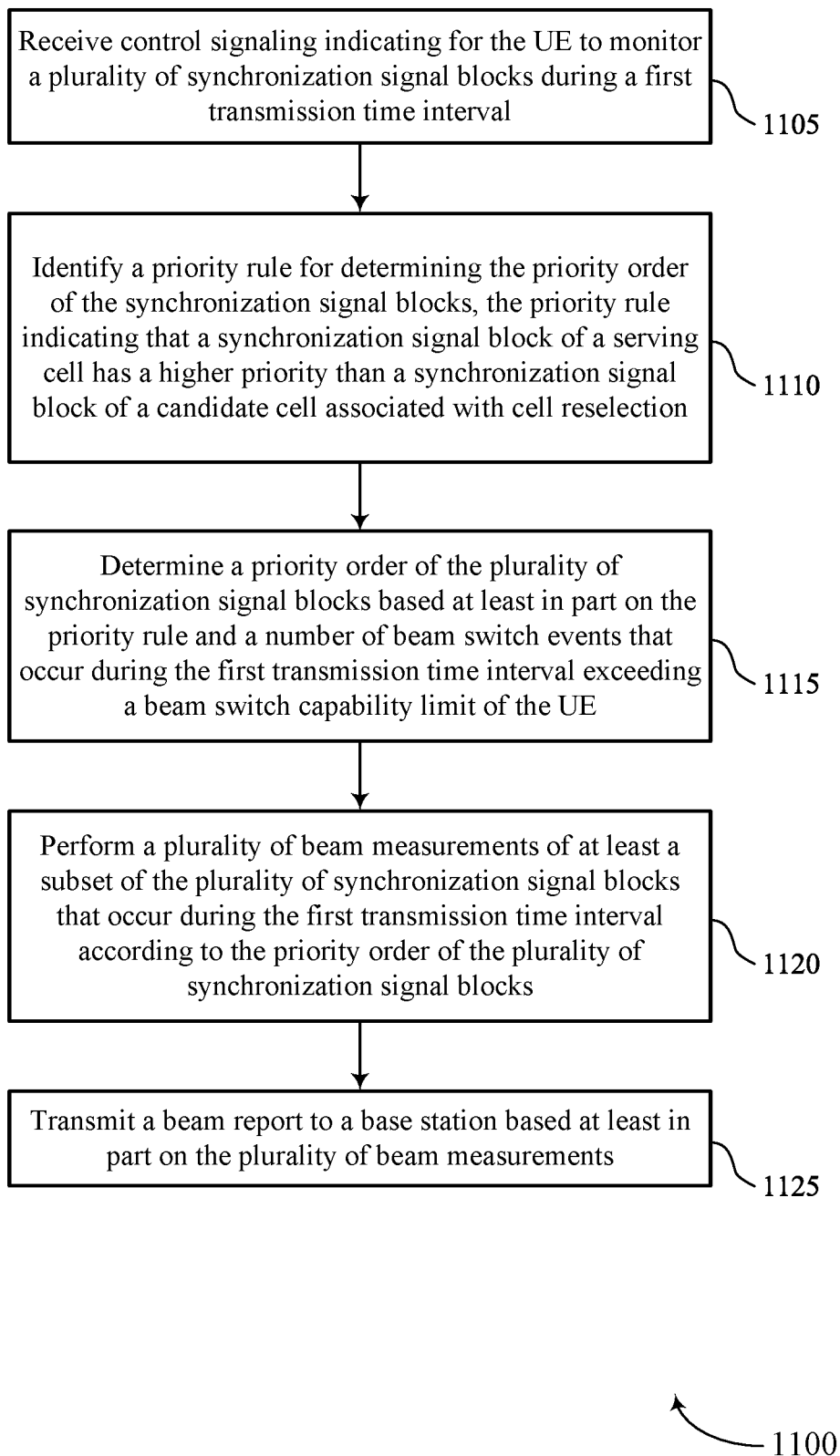

FIG. 11 shows a flowchart illustrating a method 1100 that supports synchronization signal block prioritization for physical broadcast channel based beam measurements in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving control signaling indicating for the UE to monitor a set of multiple synchronization signal blocks during a first transmission time interval. The operations of 1105 may be performed in accordance with examples as disclosed herein. In some examples, aspects of the operations of 1105 may be performed by a control manager 825 as described with reference to FIG. 8.

At 1110, the method may include determining a priority order of the set of multiple synchronization signal blocks based on a number of beam switch events that occur during the first transmission time interval exceeding a beam switch capability limit of the UE. The operations of 1110 may be performed in accordance with examples as disclosed herein. In some examples, aspects of the operations of 1110 may be performed by a priority manager 830 as described with reference to FIG. 8.

At 1115, the method may include performing a set of multiple beam measurements of at least a subset of the set of multiple synchronization signal blocks that occur during the first transmission time interval according to the priority order of the set of multiple synchronization signal blocks. The operations of 1115 may be performed in accordance with examples as disclosed herein. In some examples, aspects of the operations of 1115 may be performed by a beam manager 835 as described with reference to FIG. 8.

At 1120, the method may include transmitting a beam report to a base station based on the set of multiple beam measurements. The operations of 1120 may be performed in accordance with examples as disclosed herein. In some examples, aspects of the operations of 1120 may be performed by a report manager 840 as described with reference to FIG. 8.

At 1125, the method may include identifying a priority rule for determining the priority order of the synchronization signal blocks, the priority rule indicating that a synchronization signal block of a serving cell has a higher priority than a synchronization signal block of a candidate cell associated with cell reselection. The operations of 1125 may be performed in accordance with examples as disclosed herein. In some examples, aspects of the operations of 1125 may be performed by a priority manager 830 as described with reference to FIG. 8.

The following provides an overview of aspects of the present disclosure:

Aspect 1: A method for wireless communication at a UE, comprising: receiving control signaling indicating for the UE to monitor a plurality of synchronization signal blocks during a first transmission time interval; determining a priority order of the plurality of synchronization signal blocks based at least in part on a number of beam switch events that occur during the first transmission time interval exceeding a beam switch capability limit of the UE; performing a plurality of beam measurements of at least a subset of the plurality of synchronization signal blocks that occur during the first transmission time interval according to the priority order of the plurality of synchronization signal blocks; and transmitting a beam report to a base station based at least in part on the plurality of beam measurements.

Aspect 2: The method of aspect 1, wherein transmitting the beam report comprising transmitting the beam report requesting that the base station transmit using a first transmission beam of a plurality of available transmission beams, wherein the plurality of beam measurements are measurements of the plurality of available transmission beams.

Aspect 3: The method of any of aspects 1 through 2, further comprising: identifying a priority rule for determining the priority order of the synchronization signal blocks, the priority rule indicating that a synchronization signal block of a serving cell has a higher priority than a synchronization signal block of a candidate cell associated with cell reselection.

Aspect 4: The method of any of aspects 1 through 3, further comprising: identifying a priority rule for determining the priority order of the synchronization signal blocks, the priority rule indicating that a synchronization signal block of a serving cell and a synchronization signal block of a candidate cell each have a higher priority than one or more other synchronization signal blocks of the plurality of synchronization signal blocks.

Aspect 5: The method of any of aspects 1 through 4, further comprising: identifying a priority rule for determining the priority order of the synchronization signal blocks, the priority rule indicating that a first synchronization signal block having a higher signal quality metric is prioritized over a second synchronization signal block having a lower signal quality metric.

Aspect 6: The method of aspect 5, further comprising: performing a measurement of a first signal quality metric of the first synchronization signal block and a second signal quality metric of the second synchronization signal block that occur during a second transmission time interval that precedes the first transmission time interval.

Aspect 7: The method of any of aspects 5 through 6, wherein the first and second signal quality metrics are reference signal received power metrics, or reference signal received quality metrics, or received signal strength indicator metrics, or signal to interference plus noise ratio metrics, or signal to noise ratio metrics, or any combination thereof.

Aspect 8: The method of any of aspects 5 through 7, comprising: rescheduling beam measurement of a physical broadcast channel of the first synchronization signal block from the first transmission time interval to a second transmission time interval that occurs after the first transmission time interval based at least in part on the priority order; and performing a beam measurement of the physical broadcast channel of the first synchronization signal block based at least in part on the rescheduling.

Aspect 9: The method of any of aspects 1 through 8, comprising: identifying a priority rule for determining the priority order of the synchronization signal blocks, the beam switch events that occur during the first transmission time interval, a subcarrier spacing of the first transmission time interval, or any combination thereof.

Aspect 10: The method of any of aspects 1 through 9, wherein each of the synchronization signal blocks comprises a primary synchronization signal, a first physical broadcast channel, a secondary synchronization signal, and a second physical broadcast channel.

Aspect 11: The method of aspect 10, further comprising: dropping a beam measurement of the second physical broadcast channel of at least one of the synchronization signal blocks based at least in part on the priority order.

Aspect 12: The method of any of aspects 10 through 11, further comprising: dropping a beam measurement of the second physical broadcast channel of a first synchronization signal block of the synchronization signal blocks before dropping a beam measurement of the second physical broadcast channel of a second synchronization signal block of the synchronization signal blocks based at least in part on the priority order indicating that a priority of the first synchronization signal block is less than a priority of the second synchronization signal block.

Aspect 13: The method of any of aspects 1 through 12, further comprising: dropping performing a beam measurement of a physical broadcast channel of a first synchronization signal block of the plurality of synchronization signal blocks based at least in part on the priority order of the synchronization signal blocks.

Aspect 14: The method of any of aspects 1 through 13, wherein the beam switch capability limit is based at least in part on a clock mode of the UE.

Aspect 15: The method of any of aspects 1 through 14, wherein the number of beam switch events that occur during the first transmission time interval are based at least in part on a number of synchronization signal blocks that occur during the first transmission time interval.

Aspect 16: The method of any of aspects 1 through 15, wherein the number of beam switch events correspond to a number of beams monitored by the UE during the first transmission time interval.

Aspect 17: An apparatus for wireless communication at a UE, comprising a processor; memory coupled with the processor; and instructions stored in the memory and executable by the processor to cause the apparatus to perform a method of any of aspects 1 through 16.

Aspect 18: An apparatus for wireless communication at a UE, comprising at least one means for performing a method of any of aspects 1 through 16.

Aspect 19: A non-transitory computer-readable medium storing code for wireless communication at a UE, the code comprising instructions executable by a processor to perform a method of any of aspects 1 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
 receiving control signaling indicating for the UE to monitor a plurality of synchronization signal blocks during a first transmission time interval;
 determining a priority order of the plurality of synchronization signal blocks based at least in part on a number of beam switch events that occur during the first transmission time interval exceeding a beam switch capability limit of the UE;

performing a plurality of beam measurements of at least a subset of the plurality of synchronization signal blocks that occur during the first transmission time interval according to the priority order of the plurality of synchronization signal blocks; and transmitting a beam report to a network entity based at least in part on the plurality of beam measurements.

2. The method of claim 1, wherein transmitting the beam report comprising:

transmitting the beam report requesting that the network entity transmit using a first transmission beam of a plurality of available transmission beams, wherein the plurality of beam measurements are measurements of the plurality of available transmission beams.

3. The method of claim 1, further comprising:

identifying a priority rule for determining the priority order of the plurality of synchronization signal blocks, the priority rule indicating that a synchronization signal block of a serving cell has a higher priority than a synchronization signal block of a candidate cell associated with cell reselection.

4. The method of claim 1, further comprising:

identifying a priority rule for determining the priority order of the plurality of synchronization signal blocks, the priority rule indicating that a synchronization signal block of a serving cell and a synchronization signal block of a candidate cell each have a higher priority than one or more other synchronization signal blocks of the plurality of synchronization signal blocks.

5. The method of claim 1, further comprising:

identifying a priority rule for determining the priority order of the plurality of synchronization signal blocks, the priority rule indicating that a first synchronization signal block having a higher signal quality metric is prioritized over a second synchronization signal block having a lower signal quality metric.

6. The method of claim 5, further comprising:

performing a measurement of a first signal quality metric of the first synchronization signal block and a second signal quality metric of the second synchronization signal block that occur during a second transmission time interval that precedes the first transmission time interval.

7. The method of claim 6, wherein the first signal quality metric and the second signal quality metric are reference signal received power metrics, or reference signal received quality metrics, or received signal strength indicator metrics, or signal to interference plus noise ratio metrics, or signal to noise ratio metrics, or any combination thereof.

8. The method of claim 5, comprising:

rescheduling a beam measurement of a physical broadcast channel of the first synchronization signal block from the first transmission time interval to a second transmission time interval that occurs after the first transmission time interval based at least in part on the priority order; and performing the beam measurement of the physical broadcast channel of the first synchronization signal block based at least in part on the rescheduling.

9. The method of claim 1, comprising:

identifying a priority rule for determining the priority order of the plurality of synchronization signal blocks, beam switch events that occur during the first transmission time interval, a subcarrier spacing of the first transmission time interval, or any combination thereof.

10. The method of claim 1, wherein each synchronization signal block of the plurality of synchronization signal blocks comprises a primary synchronization signal, a first physical broadcast channel, a secondary synchronization signal, and a second physical broadcast channel.

11. The method of claim 10, further comprising:

dropping a beam measurement of the second physical broadcast channel of at least one synchronization signal block of the plurality of synchronization signal blocks based at least in part on the priority order.

12. The method of claim 10, further comprising:

dropping a beam measurement of the second physical broadcast channel of a first synchronization signal block of the plurality of synchronization signal blocks before dropping a beam measurement of the second physical broadcast channel of a second synchronization signal block of the plurality of synchronization signal blocks based at least in part on the priority order indicating that a priority of the first synchronization signal block is less than a priority of the second synchronization signal block.

13. The method of claim 1, further comprising:

dropping performing a beam measurement of a physical broadcast channel of a first synchronization signal block of the plurality of synchronization signal blocks based at least in part on the priority order of the plurality of synchronization signal blocks.

14. The method of claim 1, wherein the beam switch capability limit is based at least in part on a clock mode of the UE.

15. The method of claim 1, wherein the number of beam switch events that occur during the first transmission time interval are based at least in part on a number of synchronization signal blocks that occur during the first transmission time interval.

16. The method of claim 1, wherein the number of beam switch events correspond to a number of beams monitored by the UE during the first transmission time interval.

17. An apparatus for wireless communication at a user equipment (UE), comprising:

a processor; and memory coupled to the processor, the memory comprising instructions executable by the processor to cause the apparatus to:

receive control signaling indicating for the UE to monitor a plurality of synchronization signal blocks during a first transmission time interval;

determine a priority order of the plurality of synchronization signal blocks based at least in part on a number of beam switch events that occur during the first transmission time interval exceeding a beam switch capability limit of the UE;

perform a plurality of beam measurements of at least a subset of the plurality of synchronization signal blocks that occur during the first transmission time interval according to the priority order of the plurality of synchronization signal blocks; and transmit a beam report to a network entity based at least in part on the plurality of beam measurements.

18. The apparatus of claim 17, wherein transmitting the beam report requesting that the network entity transmit using a first transmission beam of a plurality of available transmission beams, wherein the plurality of beam measurements are measurements of the plurality of available transmission beams.

19. The apparatus of claim 17, wherein the instructions are further executable by the processor to cause the apparatus to:
identify a priority rule for determining the priority order of the plurality of synchronization signal blocks, the priority rule indicating that a synchronization signal block of a serving cell has a higher priority than a synchronization signal block of a candidate cell associated with cell reselection.

20. The apparatus of claim 17, wherein the instructions are further executable by the processor to cause the apparatus to:
identify a priority rule for determining the priority order of the plurality of synchronization signal blocks, the priority rule indicating that a synchronization signal block of a serving cell and a synchronization signal block of a candidate cell each have a higher priority than one or more other synchronization signal blocks of the plurality of synchronization signal blocks.

21. The apparatus of claim 17, wherein the instructions are further executable by the processor to cause the apparatus to:
identify a priority rule for determining the priority order of the plurality of synchronization signal blocks, the priority rule indicating that a first synchronization signal block having a higher signal quality metric is prioritized over a second synchronization signal block having a lower signal quality metric.

22. The apparatus of claim 21, wherein the instructions are further executable by the processor to cause the apparatus to:
perform a measurement of a first signal quality metric of the first synchronization signal block and a second signal quality metric of the second synchronization signal block that occur during a second transmission time interval that precedes the first transmission time interval.

23. The apparatus of claim 22, wherein the first signal quality metric and the second signal quality metric are reference signal received power metrics, or reference signal received quality metrics, or received signal strength indicator metrics, or signal to interference plus noise ratio metrics, or signal to noise ratio metrics, or any combination thereof.

24. The apparatus of claim 21, wherein the instructions are further executable by the processor to cause the apparatus to:
reschedule beam measurement of a physical broadcast channel of the first synchronization signal block from the first transmission time interval to a second transmission time interval that occurs after the first transmission time interval based at least in part on the priority order; and
perform a beam measurement of the physical broadcast channel of the first synchronization signal block based at least in part on the rescheduling.

25. The apparatus of claim 17, wherein the instructions are further executable by the processor to cause the apparatus to:
identify a priority rule for determining the priority order of the plurality of synchronization signal blocks, beam switch events that occur during the first transmission time interval, a subcarrier spacing of the first transmission time interval, or any combination thereof.

26. The apparatus of claim 17, wherein each synchronization signal block of the plurality of synchronization signal blocks comprises a primary synchronization signal, a first physical broadcast channel, a secondary synchronization signal, and a second physical broadcast channel.

27. The apparatus of claim 26, wherein the instructions are further executable by the processor to cause the apparatus to:
drop a beam measurement of the second physical broadcast channel of at least one synchronization signal block of the plurality of synchronization signal blocks based at least in part on the priority order.

28. The apparatus of claim 26, wherein the instructions are further executable by the processor to cause the apparatus to:
drop a beam measurement of the second physical broadcast channel of a first synchronization signal block of the plurality of synchronization signal blocks before dropping a beam measurement of the second physical broadcast channel of a second synchronization signal block of the plurality of synchronization signal blocks based at least in part on the priority order indicating that a priority of the first synchronization signal block is less than a priority of the second synchronization signal block.

29. An apparatus for wireless communication at a user equipment (UE), comprising:
means for receiving control signaling indicating for the UE to monitor a plurality of synchronization signal blocks during a first transmission time interval;
means for determining a priority order of the plurality of synchronization signal blocks based at least in part on a number of beam switch events that occur during the first transmission time interval exceeding a beam switch capability limit of the UE;
means for performing a plurality of beam measurements of at least a subset of the plurality of synchronization signal blocks that occur during the first transmission time interval according to the priority order of the plurality of synchronization signal blocks; and
means for transmitting a beam report to a network entity based at least in part on the plurality of beam measurements.

30. A non-transitory computer-readable medium storing code for wireless communication at a user equipment (UE), the code comprising instructions executable by a processor to:
receive control signaling indicating for the UE to monitor a plurality of synchronization signal blocks during a first transmission time interval;
determine a priority order of the plurality of synchronization signal blocks based at least in part on a number of beam switch events that occur during the first transmission time interval exceeding a beam switch capability limit of the UE;
perform a plurality of beam measurements of at least a subset of the plurality of synchronization signal blocks that occur during the first transmission time interval according to the priority order of the plurality of synchronization signal blocks; and
transmit a beam report to a network entity based at least in part on the plurality of beam measurements.

* * * * *